(12) United States Patent
Doering et al.

(10) Patent No.: US 11,161,510 B2
(45) Date of Patent: Nov. 2, 2021

(54) METHODS AND SYSTEM FOR OPERATING A HYBRID VEHICLE

(71) Applicant: Ford Global Technologies, LLC, Dearborn, MI (US)

(72) Inventors: Jeffrey Doering, Canton, MI (US); Jason Meyer, Canton, MI (US); Stan L. Bower, Ann Arbor, MI (US); Xiaoyong Wang, Novi, MI (US); Yanan Zhao, Ann Arbor, MI (US); Walter Joseph Ortmann, Saline, MI (US); Ming Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 642 days.

(21) Appl. No.: 15/891,216

(22) Filed: Feb. 7, 2018

(65) Prior Publication Data

US 2018/0251131 A1    Sep. 6, 2018

Related U.S. Application Data

(60) Provisional application No. 62/467,760, filed on Mar. 6, 2017.

(51) Int. Cl.
| | |
|---|---|
| *B60W 30/18* | (2012.01) |
| *B60W 10/08* | (2006.01) |
| *B60W 10/184* | (2012.01) |
| *B60W 20/00* | (2016.01) |
| *B60K 6/48* | (2007.10) |
| *B60W 20/10* | (2016.01) |
| *B60K 6/52* | (2007.10) |
| *B60W 20/19* | (2016.01) |

(52) U.S. Cl.
CPC ......... *B60W 30/18127* (2013.01); *B60K 6/48* (2013.01); *B60K 6/52* (2013.01); *B60W 10/08* (2013.01); *B60W 10/184* (2013.01); *B60W 20/00* (2013.01); *B60W 20/10* (2013.01); *B60W 20/19* (2016.01); B60K 2006/4808 (2013.01); B60W 2510/083 (2013.01); B60W 2510/18 (2013.01); B60W 2540/10 (2013.01); B60W 2540/12 (2013.01); B60W 2710/083 (2013.01); B60W 2710/18 (2013.01); B60Y 2200/92 (2013.01); Y10S 903/93 (2013.01); Y10S 903/947 (2013.01)

(58) Field of Classification Search
None
See application file for complete search history.

(56) References Cited

U.S. PATENT DOCUMENTS

| | | |
|---|---|---|
| 6,278,916 B1 | 8/2001 | Crombez |
| 6,480,779 B2 | 11/2002 | Mardberg |
| 7,771,312 B2 | 8/2010 | Sigmund |
| 8,930,053 B2 | 1/2015 | Hashimoto et al. |

(Continued)

*Primary Examiner* — Lail A Kleinman
(74) *Attorney, Agent, or Firm* — David Kelley; McCoy Russell LLP

(57) ABSTRACT

Methods and systems are provided for operating a driveline of a hybrid vehicle that includes an internal combustion engine, an electric machine, an integrated starter/generator, and a transmission are described. In one example, transmission output torque and electric machine torque are adjusted while a brake pedal and accelerator pedal are contemporaneously applied.

9 Claims, 10 Drawing Sheets

(56) References Cited

U.S. PATENT DOCUMENTS

| | | | | |
|---|---|---|---|---|
| 2015/0057901 A1* | 2/2015 | Sundholm | ............ | B60W 10/04 |
| | | | | 701/67 |
| 2015/0367853 A1* | 12/2015 | Yaguchi | ................ | B60K 28/00 |
| | | | | 701/99 |
| 2017/0217424 A1* | 8/2017 | Park | ...................... | B60W 20/20 |
| 2019/0168743 A1* | 6/2019 | Friedrich | ............... | B60K 6/387 |

* cited by examiner

METHODS AND SYSTEM FOR OPERATING A HYBRID VEHICLE

CROSS REFERENCE TO RELATED APPLICATION

The present application claims priority to U.S. Provisional Patent Application No. 62/467,760 entitled "Methods and System for Operating a Hybrid Vehicle," filed on Mar. 6, 2017. The entire contents of the above-referenced application are hereby incorporated by reference in its entirety for all purposes.

FIELD

The present description relates generally to methods and systems for controlling a driveline of a hybrid vehicle. The methods and systems may be particularly useful for hybrid vehicles that may be operated in a performance mode.

BACKGROUND/SUMMARY

A hybrid vehicle may include an internal combustion engine and one or more electric machines to provide propulsive power. The electric machine(s) may be a sole source of propulsive power during low driver demand conditions when the hybrid vehicle's battery has a high state of charge. The electric machine(s) may also assist the internal combustion engine during high driver demand conditions. During some operating conditions, the electric machine(s) may operate in a generator mode to convert the vehicle's kinetic energy and/or engine power into electrical energy. Thus, the electric machine(s) may provide positive torque to a hybrid vehicle driveline to assist propulsion or it/they may provide a negative torque to the hybrid vehicle driveline to slow the hybrid vehicle or recover energy into an energy storage device (e.g., a battery). Torque adjustments to the electric machine and the internal combustion engine may become complicated if a human driver or an automated driver simultaneously commands vehicle braking and vehicle acceleration via an accelerator pedal and a brake pedal or other means of control. One way to simplify engine and electric machine torque adjustments during simultaneous braking and acceleration requests may be to reduce driveline output torque via reducing engine output torque and maintaining engine speed. However, maintaining engine speed via an electric machine while reducing engine output torque may reduce driveline efficiency and/or performance.

The inventors herein have recognized the above-mentioned issues and have developed a driveline operating method, comprising: providing a total vehicle torque via adding a first requested amount of braking torque to a first requested amount of vehicle acceleration torque in response to an accelerator pedal and a brake pedal being contemporaneously applied in a first mode, the first requested amount of braking torque responsive to brake pedal position, the first requested amount of vehicle acceleration torque responsive to accelerator pedal position; and providing a second requested amount of vehicle acceleration torque responsive to accelerator pedal position and a second requested amount of braking torque responsive to brake pedal position in response to the accelerator pedal and the brake pedal being contemporaneously applied in a second mode, the second requested amount of vehicle acceleration torque responsive to accelerator pedal position and not brake pedal position, the second requested amount of braking torque responsive to brake pedal position and not accelerator pedal position.

By producing a vehicle acceleration torque responsive to accelerator pedal position and not brake pedal position when an accelerator pedal and brake pedal are contemporaneously applied, it may be possible to operate a driveline under conditions that improve driveline torque response so that the driveline may be respond with greater authority responsive to a request for increased vehicle acceleration when a higher level of vehicle performance is desired. Further, by producing vehicle braking torque responsive to a brake pedal position and not accelerator pedal position, a desired level of vehicle braking torque may be provided. The vehicle braking torque may be provided as a regenerative torque so that driveline efficiency may be improved. Thus, instead of canceling vehicle acceleration torque with requested braking torque and lowering engine output torque, both engine torque and electric machine torque are provided in a way that may improve driveline torque response while allowing the vehicle's kinetic energy to be converted into electrical energy.

The present description may provide several advantages. In particular, the approach may improve driveline torque response. Further, the approach provides for improved vehicle response when a brake pedal and an accelerator pedal are contemporaneously applied. In addition, the approach may scale driver demand torque and regenerative braking torque as a function of accelerator pedal position to adjust engine and electric machine output so that at least some engine torque and some regenerative braking torque may be provided during contemporaneous application of a vehicle brake pedal and a vehicle accelerator pedal. Additionally, the approach may provide a regenerative braking torque while engine torque is requested to improve conversion of the vehicle's kinetic energy into electrical energy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4A:
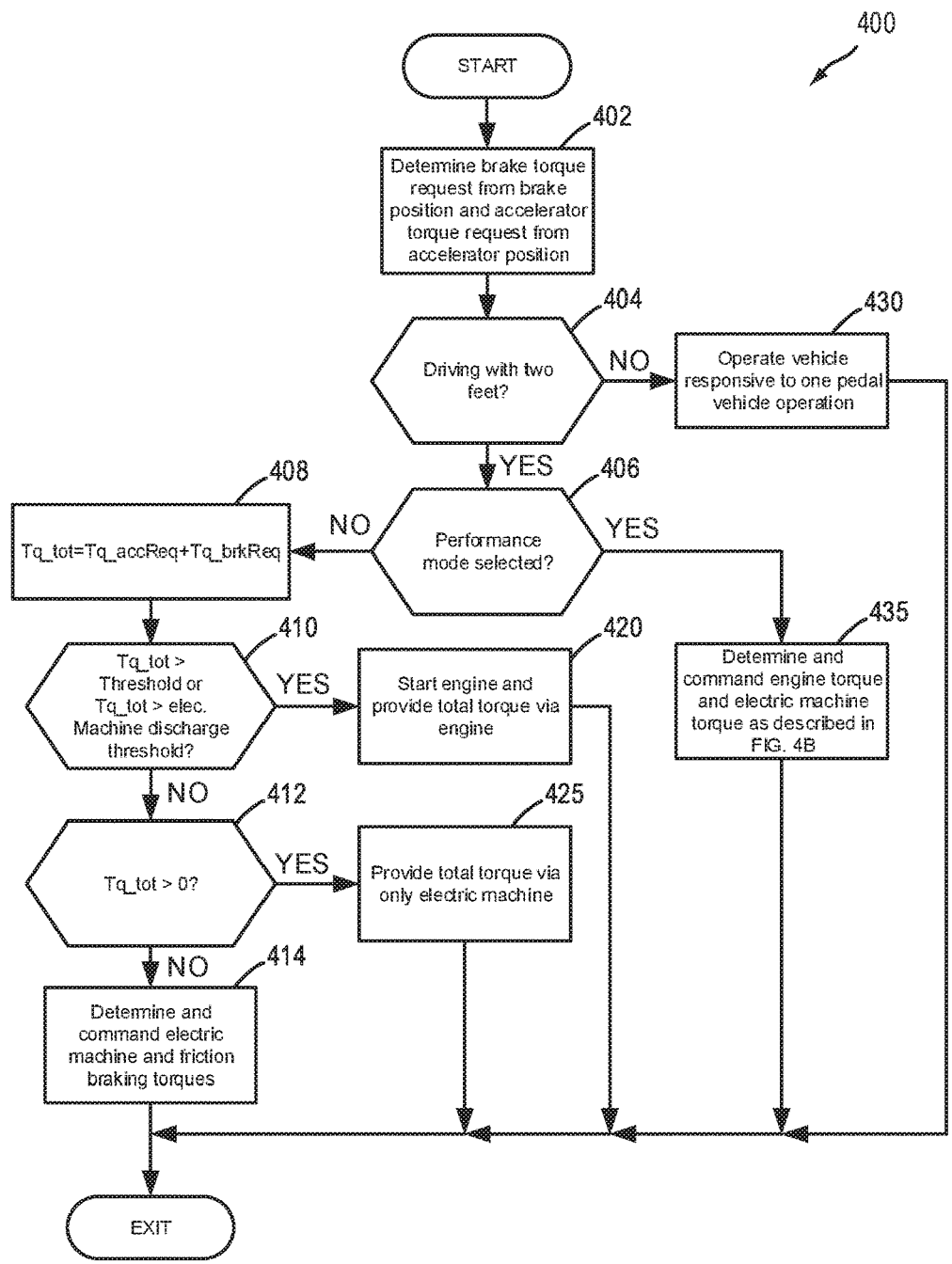
FIGS. 4A and 4B show a flowchart and block diagram of a method for operating a driveline when a brake pedal and an accelerator pedal are contemporaneously applied.
Figure 4B:
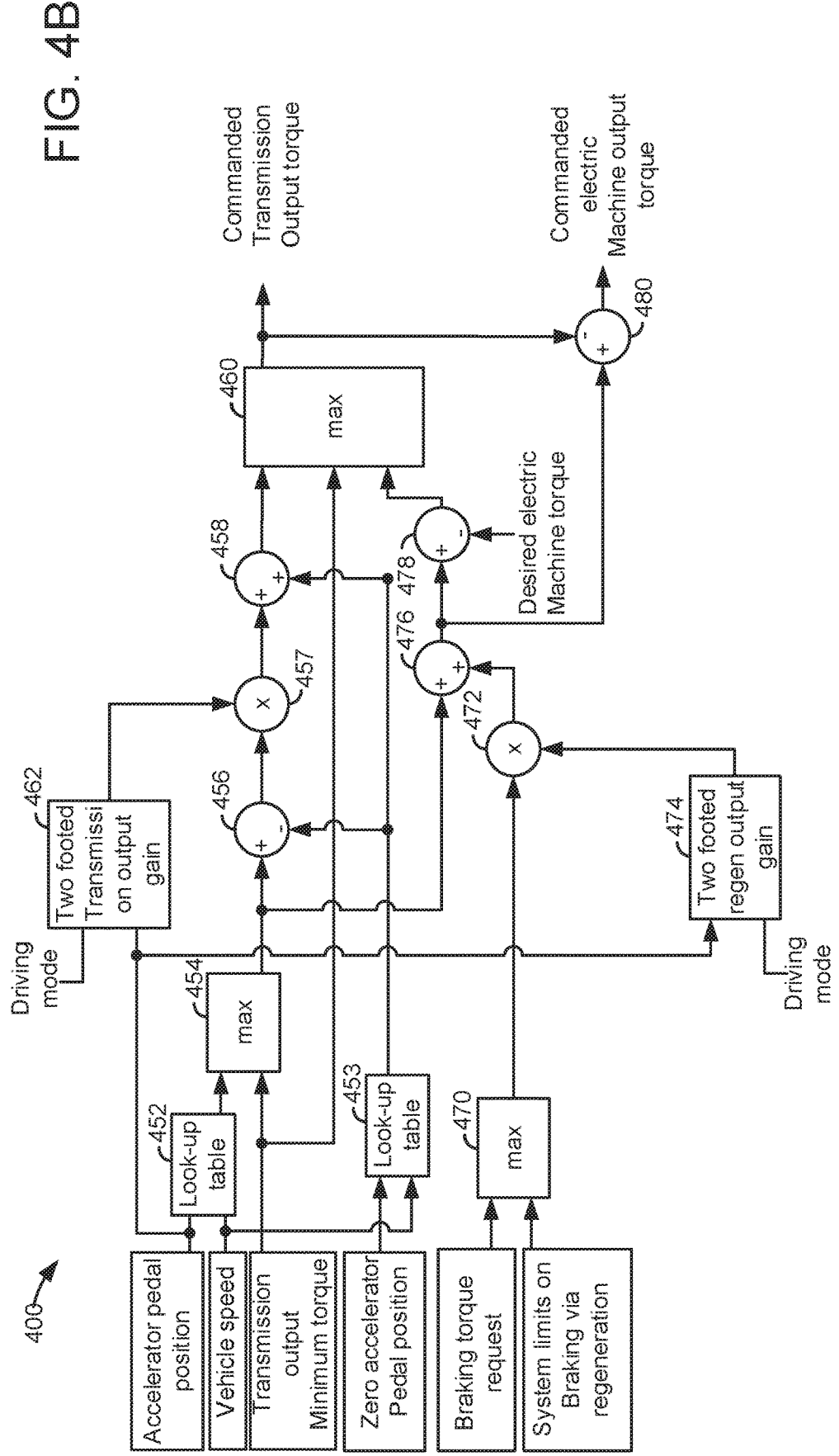
Figure 5A:
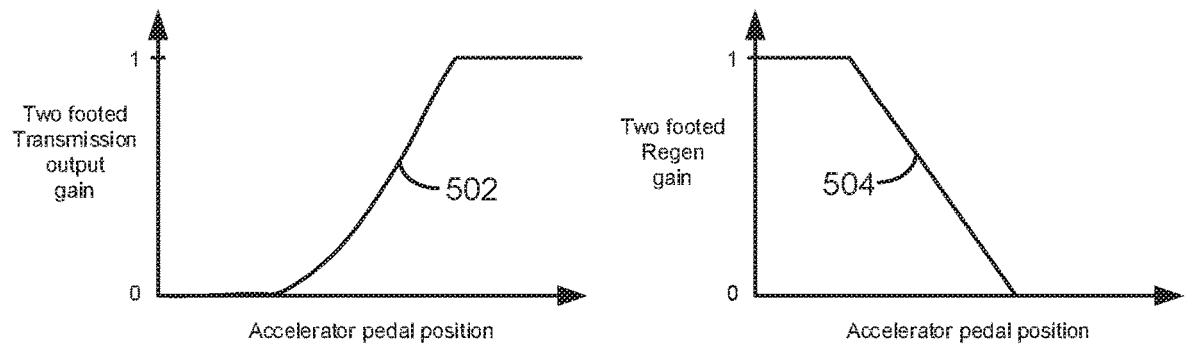
FIGS. 5A and 5B show example plots of gains or scaling functions for driver demand torque and braking torque.
Figure 5B:
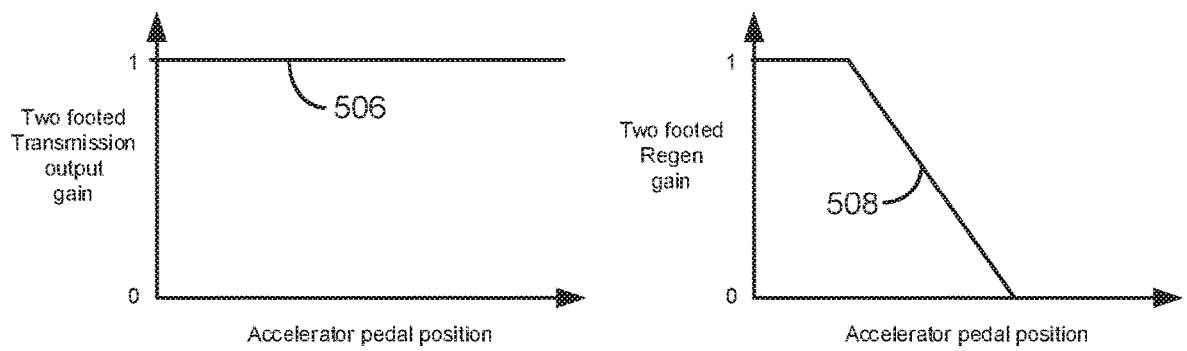
Figure 6:
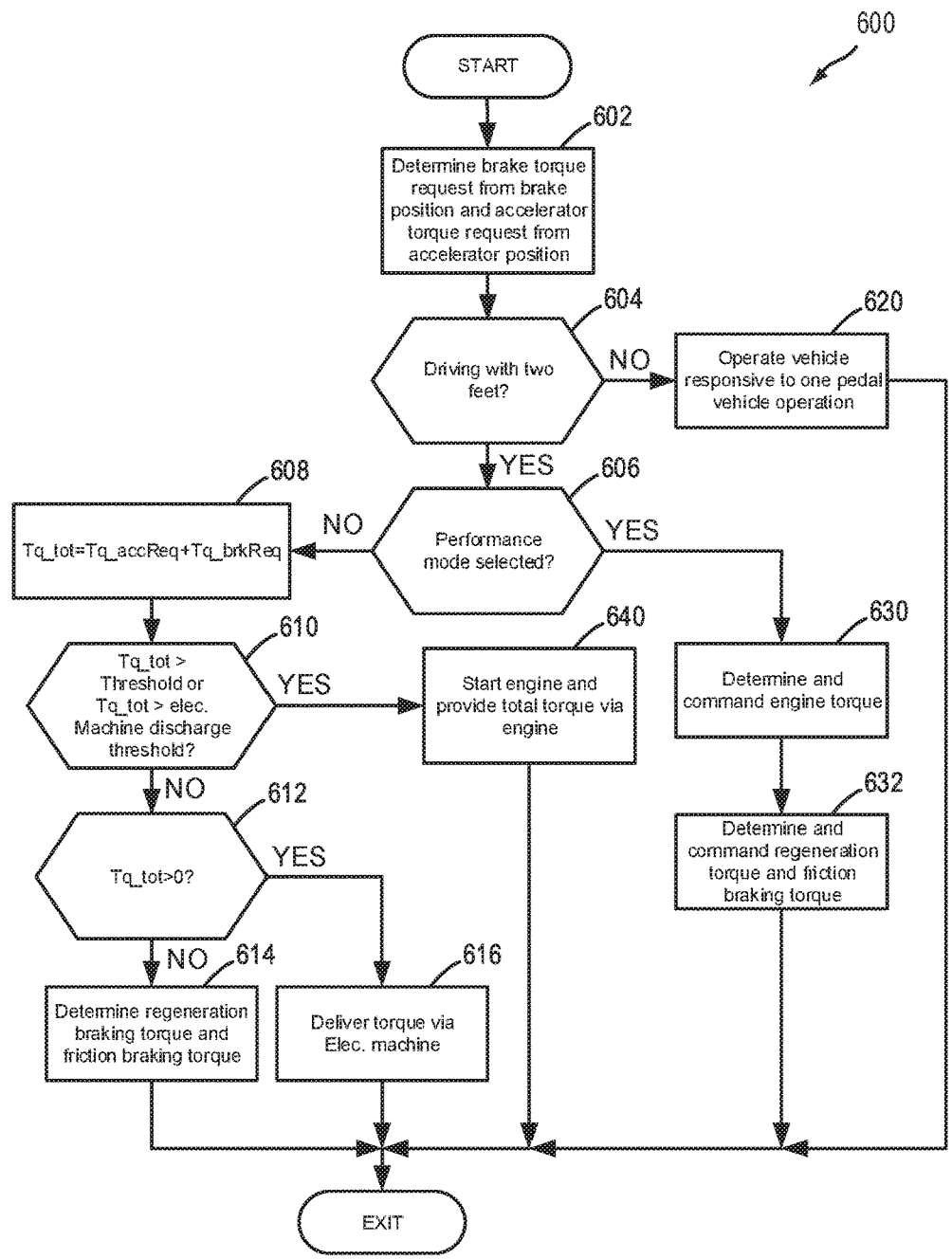
FIG. 6 shows a flowchart of a second example method for operating a driveline when a brake pedal and an accelerator pedal are contemporaneously applied.

The following description relates to systems and methods for operating a driveline of a hybrid vehicle. FIGS. 1A-3 show an example hybrid vehicle system that includes a driveline with an internal combustion engine, an integrated starter/generator, a dual clutch transmission, and an electric machine that may adjust output torque of the hybrid vehicle driveline. FIGS. 4A and 4B show a method for controlling driveline torque while a vehicle's brake pedal and accelerator pedal are contemporaneously applied. FIGS. 5A and 5B show example gain functions for the method of FIGS. 4A and 4B. FIG. 6 shows a flowchart of a second method for controlling driveline torque while a brake pedal and accelerator pedal are contemporaneously applied. Plots of a driveline operating sequence according to the method of FIG. 6 are provided in FIG. 7.

Figure 1A:
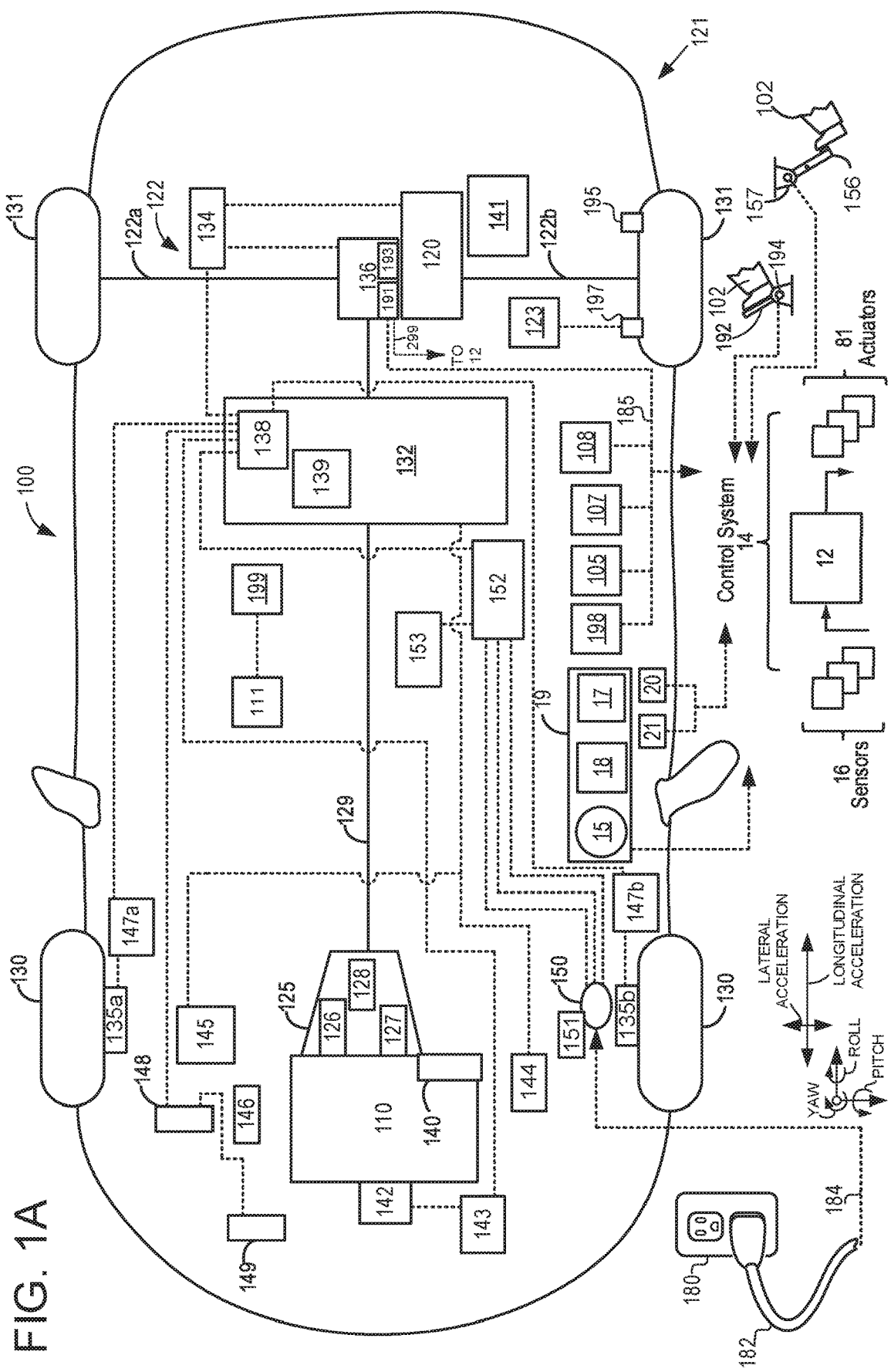
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drive unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In other examples, transmission 125 may be a continuously variable transmission (CVT) or a step-ratio planetary transmission. In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as 11 as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data frorr inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 as shown in FIG. 1C.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
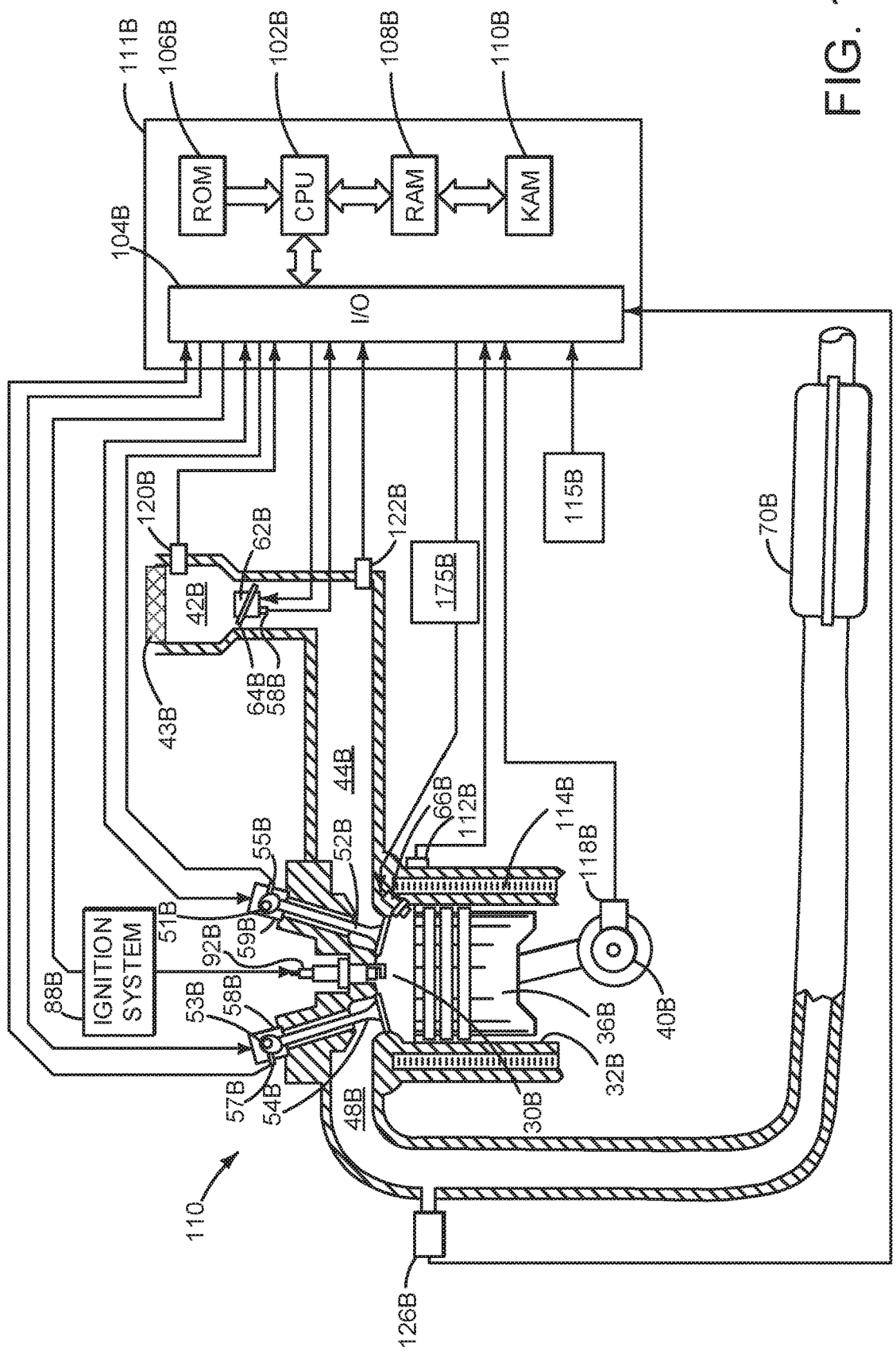
FIG. 1B is a sketch of an engine of the hybrid vehicle driveline.
Figure 1C:
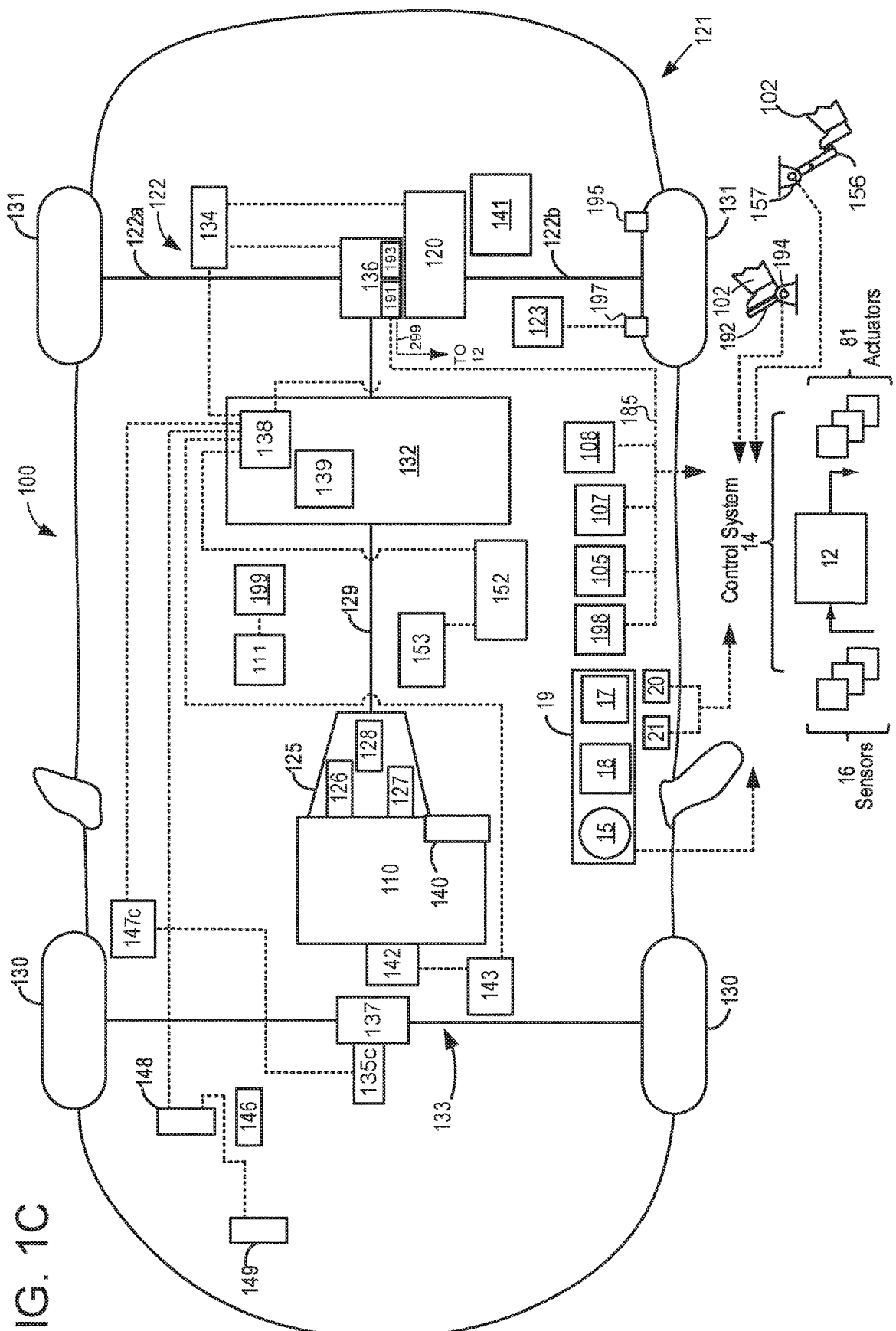
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135*c* may provide positive or negative torque to front wheels 130 via front drive unit 137, which may include a differential. In some examples, the electric machine 135*c* and the front drive unit 137 are considered part of front axle 133. Thus, front axle 133 may provide regenerative braking or torque to propel vehicle 121. Further, electric machine 135*c* may receive electrical power from, or provide electrical power to, electric energy storage device 132. Front axle 133 may be referred to as an independently driven axle. The other components shown in FIG. 1C may operate as previously described.

Figure 2:
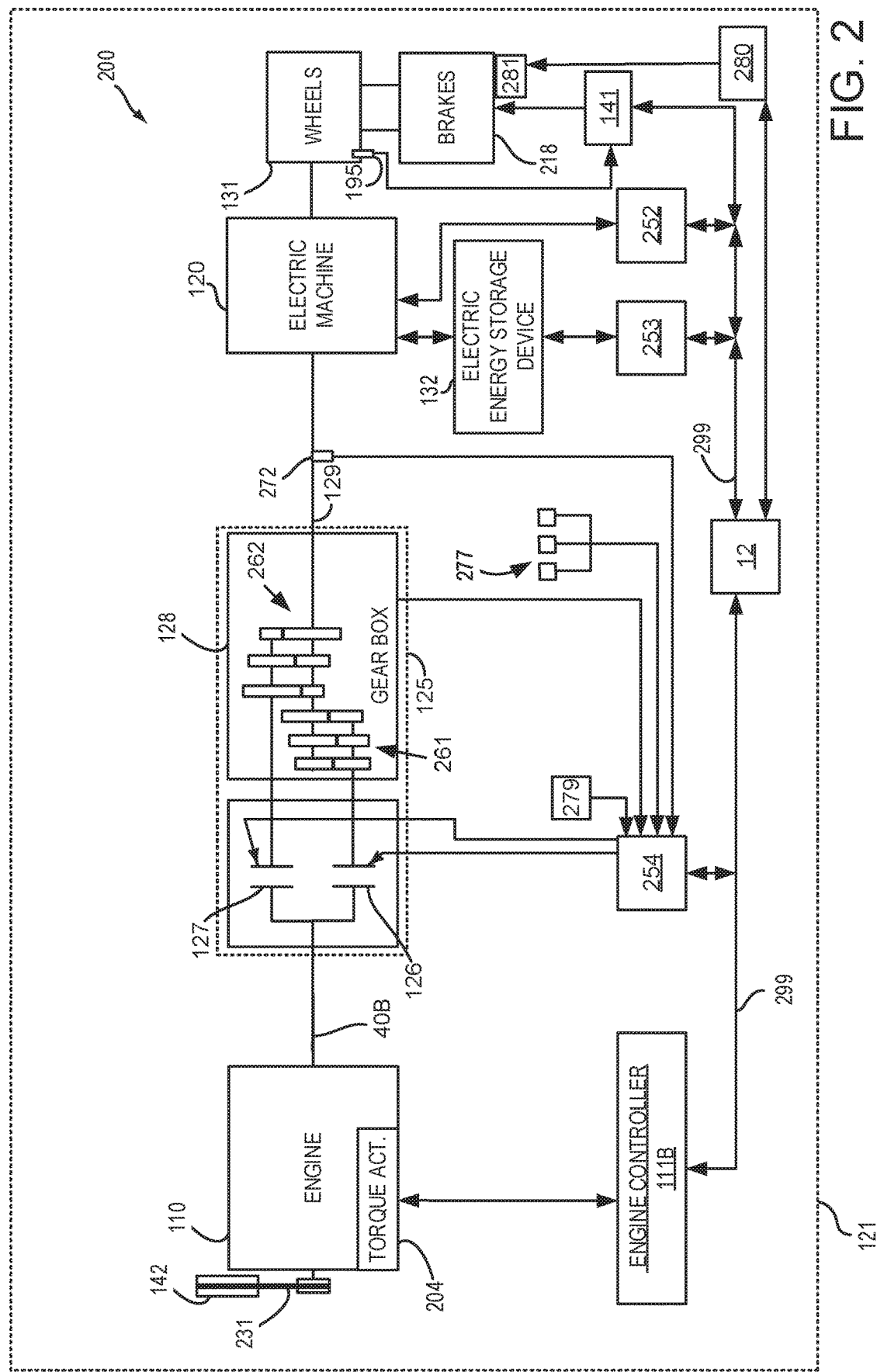
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to a human driver pressing their foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
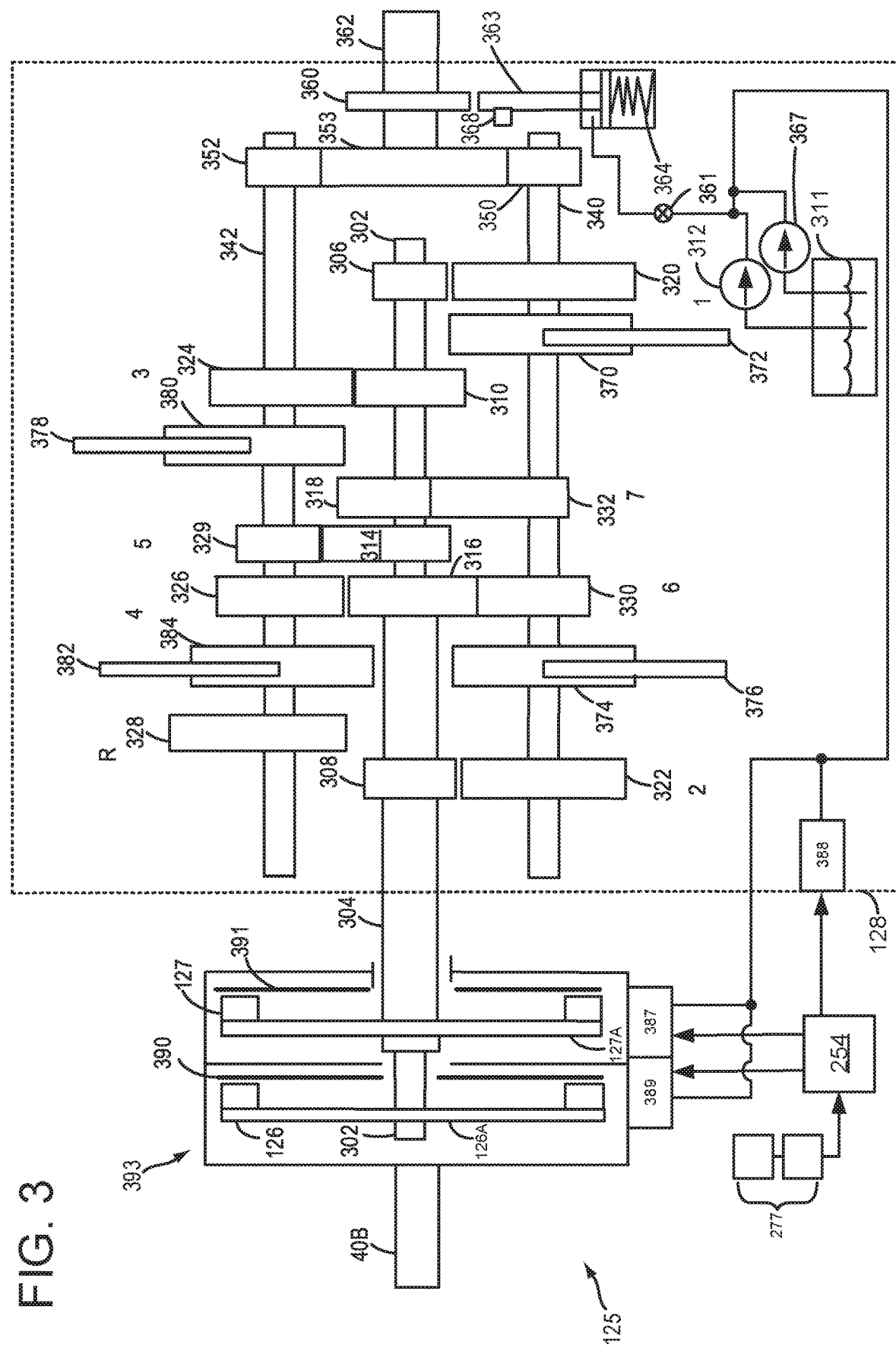
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIGS. 4A and 4B, an example method for operating a hybrid driveline to improve driveline efficiency and performance during two footed driving is shown. The method of FIGS. 4A and 4B may be incorporated into and may cooperate with the system of FIGS. 1A-3. Further, at least portions of the method of FIGS. 4A and 4B may be incorporated as executable instructions stored in non-transitory memory while other portions of the method may be performed via a controller transforming operating states of devices and actuators in the physical world.

At 402, method 400 determines a vehicle braking torque request and a driver demand torque request. In one example, method 400 determines a vehicle braking torque request from a position of a brake pedal and a table that is indexed or referenced according to the brake pedal position. The table includes empirically determined values of vehicle brake torque that are a function of the brake pedal position. For example, if the brake pedal position is zero or not applied, the table outputs a value of zero vehicle braking torque. If the vehicle brake pedal is applied to 10% of full stroke, the table may output a value corresponding to 10% of the vehicle's braking torque capacity (e.g., a maximum braking torque threshold applied to vehicle wheels or the vehicle's driveline to slow the vehicle). The vehicle braking torque is a negative torque that may slow the vehicle. Method 400 determines the vehicle braking torque from the table's output.

Similarly, method 400 determines a driver demand torque request or a vehicle acceleration torque request from a position of an accelerator pedal and a table that is indexed or referenced according to the accelerator pedal position. The table includes empirically determined values of driver demand torque that are a function of the accelerator pedal position. For example, if the accelerator pedal position is zero or not applied, the table outputs a small positive value (e.g., 10 N-m) of driver demand torque at low vehicle speeds and a small or moderate negative torque value at higher vehicle and/or engine speeds. The driver demand torque may correspond to a specific location along the driveline. For example, the driver demand torque may correspond to an engine output torque, a transmission output torque, or a wheel torque. If the accelerator pedal is applied to 10% of full stroke, the table may output a value corresponding to 10% of the vehicle's positive torque capacity (e.g., an upper positive torque threshold applied to vehicle wheels or the vehicle's driveline to slow the vehicle). The vehicle driver demand torque is a positive torque that may accelerate the vehicle. Method 400 determines the driver demand torque from the table's output.

In alternative systems, a controller (e.g. a controller of an autonomous vehicle) may request driver demand torque and vehicle braking torque via variables stored in controller transitory memory or via signals such as analog or digital inputs and outputs instead of from accelerator and brake pedals. Method 400 proceeds to 404.

At 404, method 400 judges if the vehicle is being driven with two feet or via a human or an autonomous controller that is contemporaneously requesting vehicle braking torque and driver demand torque. In one example, method 400 may judge that the vehicle is being driven with two feet if the human or autonomous demanded propulsion torque is greater than a threshold and the demanded vehicle braking torque has a magnitude greater than a threshold. In another example, this judgment could be based on the positions of the accelerator and brake pedals directly. If method 400 judges that the driver demand torque determined at 402 is greater than a threshold and the vehicle braking torque magnitude determined at 402 is greater than a threshold, the answer is yes and method 400 proceeds to 406. Otherwise, the answer is no and method 400 proceeds to 430. Note that an autonomous demanded propulsion torque may be described as a virtual demand torque and it may be determined via accelerator pedal position or a variable that represents accelerator pedal position located in controller memory.

At 430, method 400 operates the vehicle responsive to one pedal or no pedal being applied. If the accelerator pedal is applied, a positive driveline torque may be provided via one or more of the driveline torque sources (e.g., the front drive unit electric machine, the rear drive unit electric machine, the integrated starter/generator, the internal combustion engine). The torque output from one or more of the driveline torque sources provides the driver demand torque or the requested vehicle acceleration torque. On the other hand, if the brake pedal is applied, a requested vehicle braking torque may be provided via one or more driveline electrical torque sources (e.g., integrated starter/generator, front drive unit electric machine, rear drive unit electric machine) and the vehicle's friction brakes. Method 400 provides the requested driver demand torque or requested vehicle braking torque and proceeds to exit.

At 406, method 400 judges whether or not the vehicle is in a performance mode. The performance mode may be selected via a human driver via an input device or via a controller using a variable in transient memory. The performance mode may be suitable for operating the vehicle on a closed test track, off road, or in other similar conditions. If method 400 judges that performance mode is requested, the answer is yes and method 400 proceeds to 435. Otherwise, the answer is no and method 400 proceeds to 408. A vehicle could be equipped with multiple modes of operation and each mode could have a unique set of logic/calibration as described in FIG. 4B.

At 435, method 400 determines and commands the transmission output torque and electric machine torque as is mentioned in the description of FIG. 4B. Method 400 proceeds to exit after determining and commanding the transmission output torque and the electric machine torque.

At 408, method 400 determines a total vehicle torque Tq_tot request. The total vehicle torque request Tq_tot is the sum of requested driver demand torque or requested vehicle acceleration torque Tq_accReq and requested braking torque Tq_brkReq (Tq_tot=Tq_accReq+TqbrkReq). The value of Tq_accReq is negative or positive and the value of Tq_brkReq is zero or negative because the brakes are always working against vehicle motion if they are applied. Thus, the vehicle braking torque may cancel at least a portion of the driver demand torque. The total vehicle torque request may be positive, negative, or zero. Method 400 proceeds to 410 after determining the total vehicle torque.

At 410, method 400 judges if the total vehicle torque request is greater than a threshold torque or if the total vehicle torque request is greater than an electrical machine discharge torque threshold (e.g., a maximum positive torque that may be provided by the electric machine). The electric machine discharger torque may be the rear drive unit electric machine discharge torque, the front drive unit electric machine discharge torque, or a combination of the front and rear electric machine discharge torques. If method 400 judges that the total vehicle torque request is greater than the threshold torque or if the total vehicle torque request is greater than the electrical machine discharge torque, the answer is yes and method 400 proceeds to 420. Otherwise, the answer is no and method 400 proceeds to 412.

At 420, method 400 starts the internal combustion engine and provides the total vehicle torque request via commanding the engine torque to the value that provides the total vehicle torque request. In one example, the total vehicle torque request may be output torque at the vehicle wheels. The engine may be commanded to provide the torque value of the total vehicle torque request by adjusting engine torque actuators such as the engine throttle, spark timing, and fuel injection timing so that the requested torque is provided at the wheels. If the engine alone is providing the total vehicle torque request engine torque is adjusted according to the following equation Tq_eng=Tq_tot/(rt_trans*rt_fd1). If the engine and the rear drive unit electric machine are to provide the total vehicle torque request, then engine torque may be determined according to the equation Tq_tot=Tq_eng*rt_trans*rt_fd1+Tq_mtrP3*rt_fd1, where Tq_mtrP3 is the rear drive unit electric machine torque. If the total torque is provided by the engine and the front drive unit electric machine, then engine torque may be determined according to the equation Tq_tot=Tq_eng*rt_trans*rt_fd1+ Tq_mtrP4*rt_fd2, where Tq_mtrP4 is the front drive unit electric machine torque and rt_fd2 is the final drive ratio of the front axle differential. Method 400 proceeds to exit after the total vehicle torque request is provided.

At 412, method 400 judges whether or not the total vehicle torque request Tq_tot is greater than zero. If method 400 judges that the value of Tq_tot is greater than zero, the vehicle braking torque is less than the driver demand or vehicle acceleration torque. If the value of Tq_tot is greater than zero, the answer is yes and method 400 proceeds to 425. Otherwise, the answer is no and method 400 proceeds to 414.

At 425, method 400 provides the value of the total vehicle torque via only one or both the front axle and rear drive unit electric machines. The torque provided via the one or both electric machines may be adjusted via adjusting the voltage and/or current supplied to the electric machines. Method 400 proceeds to exit.

At 414, method 400 determines and commands the electric machine torque and the friction brake torque. In one example, method 400 determines the electric machine torque by selecting a maximum of a maximum regeneration torque (Tq_regen) and the total vehicle torque request Tq_tot (e.g., Tq_elec=max(Tq_regen, Tq_tot)), where Tq_elec is the electric machine torque. The electric machine torque may include torque of the front drive unit electric machine, rear drive unit electric machine torque, or both front and rear electric machine torques. The friction braking torque is then determined via subtracting the electric machine torque from the total vehicle torque request (e.g., Tq_frict=Tq_tot−Tq_elec), where Tq_frict is the friction braking torque provided via the vehicle's friction brakes. Method 400 proceeds to exit.

In this way, electric machine torque and transmission output torque may be adjusted to provide a desired driveline torque. Further, the driver demand torque and the braking torque may be scaled so that at least a portion of driver demand torque and at least a portion of braking torque may be contemporaneously provided to increase vehicle performance while converting the vehicle's kinetic energy into electrical energy.

Referring now to FIG. 4B, a block diagram 450 of a method to adjust transmission output torque and vehicle braking torque responsive to contemporaneously applying a vehicle brake pedal and a vehicle accelerator pedal. The operations described in FIG. 4B may be incorporated into the method of FIG. 4A.

Accelerator pedal position is used to reference or index look-up table 452 and provide input to two footed transmission output gain block 462 and two footed regeneration output gain block 474. Vehicle speed is also input look-up table 452 and look-up table 452 contains empirically determined values of driver demand torque or requested vehicle acceleration torque. The two footed transmission output gain block 462 outputs a value between zero and one that is used to modify driver demand torque so that transmission output torque may be modified responsive to conditions when a driver or controller is contemporaneously requesting braking torque and acceleration torque or driver demand torque. The two footed regeneration output gain block 474 outputs a value between zero and one that is used to modify a braking request so that electric machine regeneration torque (e.g., electric machine torque replacing application of friction brakes in response to brake pedal application) may be modified responsive to conditions when a driver or controller is contemporaneously requesting braking torque and acceleration torque or driver demand torque. Examples of two footed transmission output gain values and two footed regeneration output gain values are shown in FIGS. 5A and 5B.

Driver demand torque and transmission output minimum torque (e.g., a minimum torque to be output via the transmission, such as a creep torque to propel the vehicle at less than 5 Kph on flat ground) are input to block 454. At block 454, a greater of the driver demand torque and the minimum torque to be output via the transmission is selected and output to summing junction 456. Thus, if the driver demand torque is 50 N-m and the minimum torque to be output via the transmission is 5 N-m, a value of 50 N-m is output to summing junction 456. Zero accelerator pedal torque (e.g., the output of look-up table 453 when the accelerator pedal position is zero) is determined from vehicle speed and zero accelerator pedal position (e.g., position of the accelerator pedal when it is not applied) and it is subtracted from the driver demand torque at summing junction 456. Vehicle speed is input look-up table 453 and look-up table 453 contains empirically determined values of zero accelerator pedal torque. Modified driver demand torque is output from summing junction 456 to multiplication junction 457 where it is multiplied or scaled by output of two footed transmission output gain block 462. Scaled driver demand torque is output from multiplication junction 457 to summing junction 458 where the zero accelerator pedal torque is added to the scaled driver demand torque. The modified scaled driver demand torque is input to block 460. The transmission output minimum torque is also input to block 460.

A braking torque request determined from brake pedal position or a braking request value stored in transitory memory is input to block 470 along with a braking torque limit or threshold as determined from vehicle operating conditions (e.g., battery state of charge, electric machine temperature, etc.). Block 470 selects a greater of the braking torque request and the braking torque limit. For example, if the braking torque request is −200 N-m and the braking torque limit is −150 N-m, block 470 selects and outputs −150 N-m as the braking torque request. The braking torque request is input to multiplying junction 472 where it is multiplied by output of block 474 to provide a scaled braking torque request. The scaled braking torque request is input to summing junction 476 along with driver demand torque or the transmission output minimum torque. Since the braking torque request values are negative and the torque output from block 454 is positive, the driver demand torque or the transmission output minimum torque is reduced by the braking torque request to provide a total desired propulsive torque. The total desired propulsive torque is output from summing junction 476 to summing junction 478 and summing junction 480.

A desired electric machine torque is subtracted from the total desired propulsive torque at summing junction 478. The desired electric machine torque may be provided from an energy management portion of a controller to charge vehicle electric energy storage devices or to propel the vehicle. The output from summing junction 478 is input to block 460. Block 460 outputs a greater value of the output of summing junction 458, transmission output minimum torque, and the output of summing junction 478. The output of block 460 is the commanded transmission output torque. The commanded transmission output torque is a torque that is provided at the output of the transmission. Engine torque, BISG torque, and transmission gears may be commanded to provide the commanded transmission output torque. For example, the engine torque plus the BISG torque multiplied by the presently engaged transmission gear ratio is adjusted to equal to the commanded transmission output torque. The output of block 460 is subtracted from the output of summing junction 466 to provide a commanded electric machine output at summing junction 480. The commanded electric machine output may be provided to the front drive unit electric machine, the rear drive unit electric machine, or both the front drive unit electric machine and the rear drive unit electric machine.

During conditions when the output of block 462 is zero and output of block 474 is zero, only friction braking is provided and regeneration braking is not provided. Further, the rear drive unit electric machine may provide positive torque to the driveline.

During conditions when the output of block 462 is one and output of block 474 is zero, only friction braking is provided and regeneration braking is not provided. Also, the rear drive unit electric machine may not provide positive torque to the driveline.

During conditions when the output of block 462 is zero and output of block 474 is one, friction braking and regenerative braking may be provided. Also, cancellation of the driver demand torque via requested braking torque may be provided.

During conditions when the output of block 462 is one and output of block 474 is one, friction braking and regenerative braking may be provided. Further, cancellation of the driver demand torque via requested braking torque is not provided.

Turning now to FIG. 5A, example plots of data stored in blocks 462 and 474 of FIG. 4B are shown. The two footed transmission output gain block 462 may include empirically determined gain or scaling values (e.g., any real number between 0 and 1) as indicated in the first plot on the left side of FIG. 5A. The first plot is a plot of two footed transmission output gain versus accelerator pedal position. The two footed transmission output gain increases in the direction of the vertical axis arrow. The accelerator pedal position increases in the direction of the horizontal axis arrow and accelerator pedal position increases as the accelerator pedal is depressed. Curve 502 shows that the two footed transmission output gain is a value of zero at low non-zero accelerator positions when the accelerator pedal is partially depressed. The two footed transmission output gain increases and then reaches a maximum value of one when the accelerator pedal is depressed a larger amount. Thus, the two footed transmission output gain may change from a value of zero to a value of one with intermediate numeric values between zero and one.

The two footed regeneration gain output gain block 474 of FIG. 4B may include empirically determined gain or scaling values as indicated in the second plot on the right side of FIG. 5A. The second plot is a plot of two footed regeneration output gain versus accelerator pedal position. The two footed regeneration output gain increases in the direction of the vertical axis arrow. The accelerator pedal position increases in the direction of the horizontal axis arrow and accelerator pedal position increases as the accelerator pedal is depressed. Curve 504 shows that the two footed regeneration output gain is a value of one at low non-zero accelerator positions when the accelerator pedal is partially depressed. The two footed transmission output gain decreases and then reaches a value of zero when the accelerator pedal is depressed a larger amount. Thus, the two footed regeneration output gain may change from a real numeric value of one to a value of zero with intermediate real number values between zero and one.

When the method of FIGS. 4A and 4B is operated with the two footed transmission output gain and the two footed regeneration gain shown in FIG. 5A, the braking torque request may cancel or reduce the driver demand torque at summing junction 476 of FIG. 4B so that transmission output torque may be reduced. The driver demand torque may be commanded to the transmission output when the accelerator pedal is depressed a greater amount, which may allow output from summing junction 458 of FIG. 4B to pass through block 460.

Referring now to FIG. 5B, example plots of data stored in blocks 462 and 474 of FIG. 4B are shown. The two footed transmission output gain block 462 may include empirically determined gain or scaling values (e.g., real numbers) as indicated in the first plot on the left side of FIG. 5B. The first plot is a plot of two footed transmission output gain versus accelerator pedal position. The two footed transmission output gain increases in the direction of the vertical axis arrow. The accelerator pedal position increases in the direction of the horizontal axis arrow and accelerator pedal position increases as the accelerator pedal is depressed. Curve 506 shows that the two footed transmission output gain is a value of one no matter the accelerator pedal position.

The two footed regeneration gain output gain block 474 of FIG. 4B may include empirically determined gain or scaling values as indicated in the second plot on the right side of FIG. 5B. The second plot is a plot of two footed regeneration output gain versus accelerator pedal position. The two footed regeneration output gain increases in the direction of the vertical axis arrow. The accelerator pedal position increases in the direction of the horizontal axis arrow and accelerator pedal position increases as the accelerator pedal is depressed. Curve 508 shows that the two footed regeneration output gain is a real numeric value of one at low non-zero accelerator positions when the accelerator pedal is partially depressed. The two footed transmission output gain decreases and then reaches a value of zero when the accelerator pedal is depressed a larger amount. Thus, the two footed regeneration output gain may change from a value of one to a value of zero with intermediate real number values between zero and one.

When the method of FIGS. 4A and 4B is operated with the two footed transmission output gain and the two footed regeneration gain shown in FIG. 5B, the braking torque request may be provided via the front drive unit electric machine, the rear drive unit electric machine, or both the front drive unit electric machine and the rear drive unit electric machine at low accelerator pedal positions. Regenerative braking may be eliminated when the when the accelerator pedal is depressed a greater amount.

Referring now to FIG. 6, a second example method for operating a hybrid driveline to improve driveline efficiency and performance during two footed driving is shown. The method of FIG. 6 may be incorporated into and may cooperate with the system of FIGS. 1A-3. Further, at least portions of the method of FIG. 6 may be incorporated as executable instructions stored in non-transitory memory while other portions of the method may be performed via a controller transforming operating states of devices and actuators in the physical world.

At 602, method 600 determines a vehicle braking torque request Tq brkReq and a driver demand torque request Tq_accReq. In one example, method 600 determines a vehicle braking torque request from a position of a brake pedal and a table that is indexed or referenced according to the brake pedal position. The table includes empirically determined values of vehicle brake torque that are a function of the brake pedal position. For example, if the brake pedal position is zero or not applied, the table outputs a value of zero vehicle braking torque. If the vehicle brake pedal is applied to 10% of full stroke, the table may output a value corresponding to 10% of the vehicle's braking torque capacity (e.g., a maximum braking torque threshold applied to vehicle wheels or the vehicle's driveline to slow the vehicle). The vehicle braking torque is a negative torque that may slow the vehicle. Method 600 determines the vehicle braking torque from the table's output.

Similarly, method 600 determines a driver demand torque request from a position of an accelerator pedal and a table that is indexed or referenced according to the accelerator pedal position. The table includes empirically determined values of driver demand torque that are a function of the accelerator pedal position. For example, if the accelerator pedal position is zero or not applied, the table outputs a small positive value (e.g., 10 N-m) of driver demand torque. The driver demand torque may correspond to a specific location along the driveline. For example, the driver demand torque may correspond to an engine output torque, a transmission output torque, or a wheel torque. If the accelerator pedal is applied to 10% of full stroke, the table may output a value corresponding to 10% of the vehicle's positive torque capacity (e.g., an upper positive torque threshold applied to vehicle wheels or the vehicle's driveline to slow the vehicle). The vehicle driver demand torque is a positive torque that may accelerate the vehicle. Method 400 determines the driver demand torque from the table's output.

In alternative systems, a controller (e.g. a controller of an autonomous vehicle) may request driver demand torque and vehicle braking torque via variables stored in controller transitory memory or via signals such as analog or digital inputs and outputs instead of from accelerator and brake pedals. Method 600 proceeds to 604.

At 604, method 600 judges if the vehicle is being driven with two feet or via a human or controller that is contemporaneously requesting vehicle braking torque and driver demand torque a power-on upshift is requested. In one example, method 600 may judge that the vehicle is being driven with two feet if the driver demand torque is greater than a threshold and the vehicle braking torque has a magnitude greater than a threshold. If method 600 judges that the driver demand torque determined at 602 is greater than a threshold and the vehicle braking torque magnitude determined at 602 is greater than a threshold, the answer is yes and method 600 proceeds to 606. Otherwise, the answer is no and method 600 proceeds to 620.

At 620, method 600 operates the vehicle responsive to one pedal or no pedal being applied. If the accelerator pedal is applied, a positive driveline torque may be provided via one or more of the driveline torque sources (e.g., the front drive unit electric machine, the rear drive unit electric machine, the integrated starter/generator, the internal combustion engine). The torque output from one or more of the driveline torque sources provides the driver demand torque. One the other hand, if the brake pedal is applied, a vehicle braking torque may be provided via one or more driveline electrical torque sources (e.g., integrated starter/generator, front drive unit electric machine, rear drive unit electric machine) and the vehicle's friction brakes. Method 600 provides the requested driver demand torque or vehicle braking torque and proceeds to exit.

At 606, method 600 judges whether or not the vehicle is in a performance mode. The performance mode may be selected via a human driver via an input device or via a controller using a variable in transient memory. The performance mode may be suitable for operating the vehicle on a closed test track, off road, or in other similar conditions. If method 600 judges that performance mode is requested, the answer is yes and method 600 proceeds to 630. Otherwise, the answer is no and method 600 proceeds to 608.

At 630, method 600 determines and commands the engine output torque. The engine output torque may be commanded according to the equation $Tq\_eng=Tq\_accReq/(rt\_trans*rt\_fd1)$, where $Tq\_eng$ is the commanded engine torque, $Tq\_accReq$ is the requested acceleration torque or the driver demand torque determined at 602, $rt\_trans$ is the gear ratio of the presently engaged transmission gear, and $rt\_fd1$ is the gear ratio of the final drive or the rear drive unit. The engine torque may be commanded via adjusting engine torque actuators such as the engine throttle, cam timing, fuel injector timing, and spark advance. The engine is also started if the commanded engine torque is greater than zero and the engine is stopped. Method 600 proceeds to 632 after determining and commanding the engine torque.

At 632, method 600 commands electric machine torque and friction braking torque. First, method 600 determines a maximum or upper threshold regenerative braking torque. In one example, the maximum regenerative braking torque may be empirically determined and stored in a table in non-transitory memory as a function of electric machine temperature and battery state of charge. Method 600 retrieves a maximum regenerative braking torque from memory via indexing or referencing the table. Method 600 then selects a greater of the maximum regenerative braking torque and the requested braking torque determined at 602. The rear drive unit electric machine and/or the front drive unit electric machine are commanded to the greater of the maximum regenerative braking torque and the requested braking torque. For example, if the maximum regenerative braking torque is −300 N-m and the requested braking torque is −200 N-m, the rear drive unit electric machine and/or the front drive unit electric machine are commanded to provide −200 N-m of torque since −200 N-m is greater than −300 N-m. The friction brakes are commanded to provide a torque according to the following equation: $Tq\_fricbrk=Tq\_brakeReq-Tq\_elec$, where $Tq\_fricbrk$ is the friction braking torque, $Tq\_brakeReq$ is the requested braking torque, and $Tq\_elec$ is the torque the electric machines (e.g., rear drive unit electric machine and/or front drive unit electric machine) are commanded to provide. Method 600 proceeds to exit after commanding the electric machine torque and the friction brake torque.

At 608, method 600 determines a total requested torque. The total requested vehicle torque may be expressed as $Tq\_tot=Tq\_accReq+Tq\_brkReq$. The driver demand torque or acceleration torque $Tq\_accReq$ is a positive value and the requested vehicle braking torque $Tq\_brkReq$ is a negative torque so that requested vehicle braking torque may cancel at least a portion of the driver demand torque. Method 600 proceeds to 610.

At 610, method 600 judges if the total vehicle torque request $Tq\_tot$ is greater than a threshold torque or if the total vehicle torque request is greater than an electrical machine discharge torque threshold (e.g., a maximum positive torque that may be provided by the electric machine). The electric machine discharger torque may be the rear drive unit electric machine discharge torque, the front drive unit electric machine discharge torque, or a combination of the front and rear electric machine discharge torques. If method 600 judges that the total vehicle torque request is greater than the threshold torque or if the total vehicle torque request is greater than the electrical machine discharge torque, the answer is yes and method 600 proceeds to 640. Otherwise, the answer is no and method 600 proceeds to 612.

At 640, method 600 starts the internal combustion engine and provides the total vehicle torque request via commanding the engine torque to the value that provides the total vehicle torque request. In one example, the total vehicle torque request may be output torque at the vehicle wheels. The engine may be commanded to provide the torque value of the total vehicle torque request by adjusting engine torque actuators such as the engine throttle, spark timing, and fuel injection timing so that the requested torque is provided at the wheels. If the engine alone is providing the total vehicle torque request engine torque is adjusted according to the following equation $Tq\_eng=Tq\_tot/(rt\_trans*rt\_fd1)$. If the engine and the rear drive unit electric machine are to provide the total vehicle torque request, then engine torque may be determined according to the equation $Tq\_tot=Tq\_eng*rt\_trans*rt\_fd1+Tq\_mtrP3*rt\_fd1$, where $Tq\_mtrP3$ is the rear drive unit electric machine torque. If the total torque is provided by the engine and the front drive unit electric machine, then engine torque may be determined according to the equation $Tq\_tot=Tq\_eng*rt\_trans*rt\_fd1+Tq\_mtrP4*rt\_fd2$, where $Tq\_mtrP4$ is the front drive unit electric machine torque and $rt\_fd2$ is the final drive ratio of the front axle differential. Method 600 proceeds to exit after the total vehicle torque request is provided via the engine.

At 612, method 600 judges whether or not the total vehicle torque request $Tq\_tot$ is greater than zero. If method 600 judges that the value of $Tq\_tot$ is greater than zero, the vehicle braking torque is less than the driver demand or vehicle acceleration torque. If the value of $Tq\_tot$ is greater than zero, the answer is yes and method 600 proceeds to 616. Otherwise, the answer is no and method 600 proceeds to 614.

At 616, method 600 provides the value of the total vehicle torque via only one or both the front axle and rear drive unit electric machines. The torque provided via the one or both electric machines may be adjusted via adjusting the voltage and/or current supplied to the electric machines. If the total vehicle torque request is provided via the rear drive unit electric machine, the rear drive unit electric machine torque is adjusted according to the following equation: $Tq\_mtrP3=Tq\_tot/rt\_fd1$. If the total vehicle torque request is provided via the front drive unit electric machine, the front drive unit electric machine torque is adjusted according to the following equation: $Tq\_mtrP4=Tq\_tot/rt\_fd2$. Method 600 proceeds to exit.

At 614, method 600 determines and commands the electric machine torque and the friction brake torque. In one example, method 600 determines the electric machine torque by selecting a maximum of a maximum regeneration torque ($Tq\_regen$) and the total vehicle torque request $Tq\_tot$ (e.g., $Tq\_elec=\max(Tq\_regen, Tq\_tot)$), where $Tq\_elec$ is the electric machine torque. The electric machine torque may include torque of the front drive unit electric machine, rear drive unit electric machine torque, or both front and rear electric machine torques. The friction braking torque is then determined via subtracting the electric machine torque from the total vehicle torque request (e.g., $Tq\_frict=Tq\_tot-Tq\_elec$), where $Tq\_frict$ is the friction braking torque provided via the vehicle's friction brakes. Method 600 proceeds to exit.

In this way, electric machine torque and transmission output torque may be adjusted to provide a desired driveline torque. In addition, the driver demand torque and the braking torque may be commanded as requested by a human driver or controller without canceling engine torque or braking torque so that increased vehicle performance may be provided.

Figure 7:
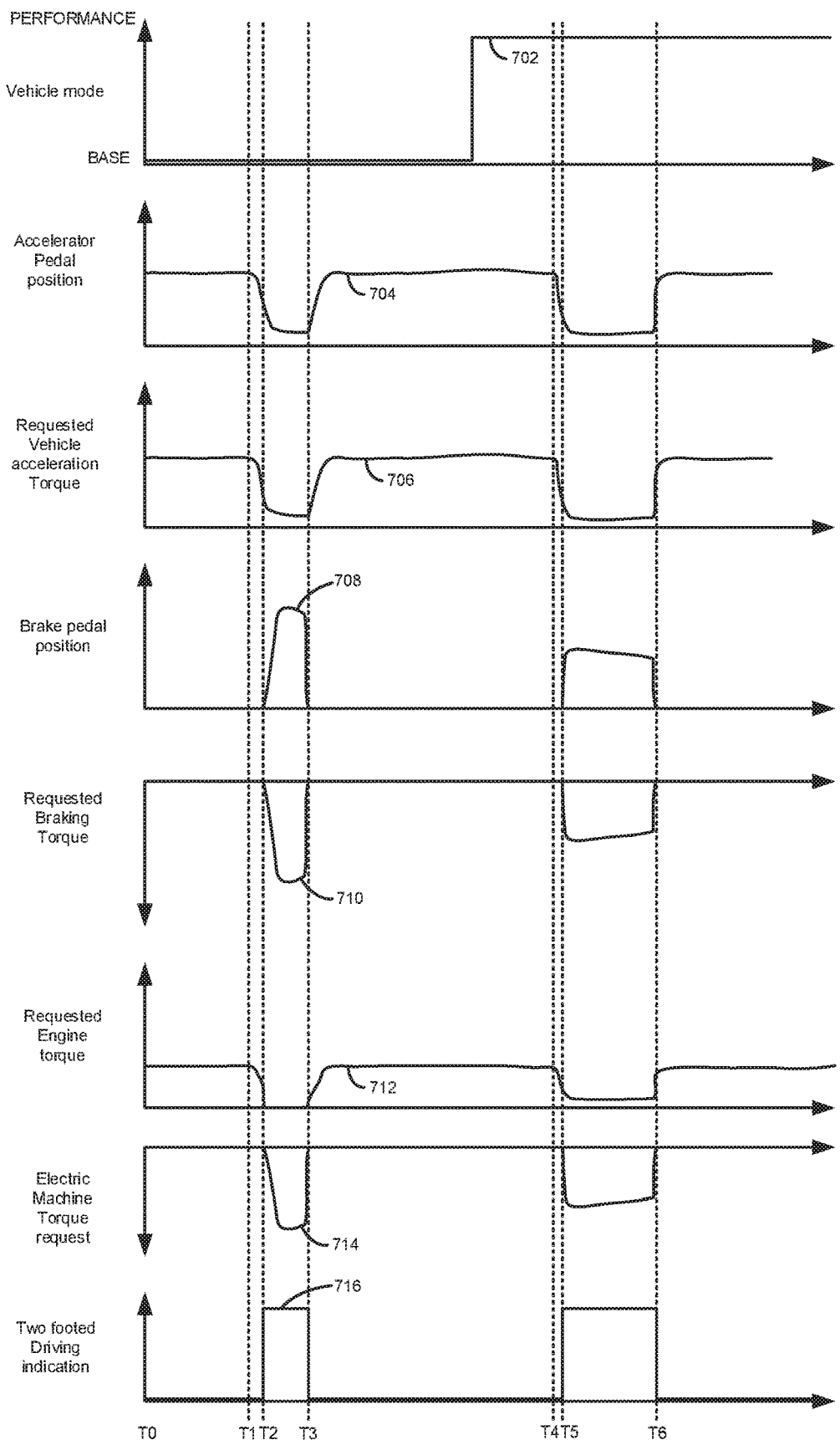
FIG. 7 shows an example sequence according to the method of FIG. 6.

Referring now to FIG. 7, a prophetic operating sequence according to the method of FIG. 6 is shown. The vehicle operating sequence shown in FIG. 7 may be provided via the method of FIG. 6 in cooperation with the system shown in FIGS. 1A-3. The plots shown in FIG. 7 occur at the same time and are aligned in time.

The first plot from the top of FIG. 7 is a plot of vehicle operating mode versus time. The vertical axis represents vehicle operating mode. The vehicle operating mode is a base or low performance mode when trace 702 is at a low level near the horizontal axis. The vehicle operating mode is a performance mode when trace 702 is at a high level near the vertical axis arrow. The horizontal axis represents time and time increases from the left side of the figure to the right side of the figure.

The second plot from the top of FIG. 7 is a plot of accelerator pedal position versus time. The vertical axis represents accelerator pedal position and the accelerator pedal is applied to a greater extent when trace 704 is closer to the vertical axis arrow. The accelerator pedal is applied to a lesser extent when trace 704 is closer to the horizontal axis. The horizontal axis represents time and time increases from the left side of the figure to the right side of the figure.

The third plot from the top of FIG. 7 is a plot of vehicle acceleration torque or driver demand torque (trace 706) versus time. The vertical axis represents requested vehicle acceleration torque and requested vehicle acceleration torque increases in the direction of the vertical axis up arrow. The vehicle acceleration torque request may be based on accelerator pedal position and vehicle speed. The vehicle acceleration torque request is a torque value at the vehicle's driven wheel. The horizontal axis represents time and time increases from the left side of the figure to the right side of the figure.

The fourth plot from the top of FIG. 7 is a plot of brake pedal position versus time. The vertical axis represents brake pedal position and the brake pedal is applied to a greater extent when trace 708 is near the vertical axis arrow. The brake pedal is applied to a lesser extent when trace 708 is near the horizontal axis. The requested vehicle braking torque is a torque value at the vehicle's wheels. The horizontal axis represents time and time increases from the left side of the figure to the right side of the figure.

The fifth plot from the top of FIG. 7 is a plot of requested braking torque (trace 710) versus time. The vertical axis represents requested braking torque and requested braking torque magnitude increases in the direction of the vertical axis down arrow. The requested braking torque may be determined from brake pedal position. The horizontal axis represents time and time increases from the left side of the figure to the right side of the figure.

The sixth plot from the top of FIG. 7 is a plot of requested engine torque (trace 712) versus time. The vertical axis represents requested engine torque and requested engine torque increases in the direction of the vertical axis arrow. The requested engine torque may be determined from the vehicle acceleration torque request and instructions that distribute the vehicle acceleration torque to the engine and electric machines. The horizontal axis represents time and time increases from the left side of the figure to the right side of the figure.

The seventh plot from the top of FIG. 7 is a plot of requested electric machine torque (trace 714) versus time. The vertical axis represents requested electric machine torque and requested electric machine torque magnitude increases in the direction of the vertical axis down arrow. The requested electric machine torque may be determined from accelerator pedal position and/or brake pedal position. The requested electric machine torque may be provided via the rear drive unit electric machine and/or the front drive unit electric machine. The horizontal axis represents time and time increases from the left side of the figure to the right side of the figure.

The eighth plot from the top of FIG. 7 is a plot of an indication of two footed driving (trace 716) versus time. The vertical axis represents the presence or absence of two footed driving. Two footed driving is indicated when trace 716 is at a higher level near the vertical axis arrow. Two footed driving is not indicated when trace 716 is at a lower level near the horizontal axis. The horizontal axis represents time and time increases from the left side of the figure to the right side of the figure.

The horizontal axis of each plot corresponds to a value of zero for the vertical axis unless otherwise noted. Further, the vertical axis of each plot corresponds to a value of zero time.

At time T0, the vehicle is not operating in a performance mode and the accelerator pedal is applied to a middle level. The requested acceleration torque is at a middle level and the brake pedal is not applied. The requested braking torque is zero and the requested engine torque is at a middle level. The requested electric machine torque is zero and two footed driving is not indicated.

At time T1, the driver (not shown) partially releases the accelerator pedal and the vehicle acceleration request begins to decline in response to accelerator pedal position. The brake pedal is not applied and the requested brake torque is zero. The requested engine torque also is reduced in response to the accelerator pedal position. The requested electric machine torque is zero and two footed driving is not indicated. The vehicle continues to operate in base or non-performance mode.

At time T2, the human driver (not shown) applies the brake pedal while the accelerator pedal is applied. The accelerator pedal continues to be released and the requested vehicle acceleration torque continues to decline as the accelerator pedal is released. The requested vehicle braking torque increases as the brake pedal position increases. The requested engine torque decreases as the accelerator pedal is released. The requested electric machine torque increases in magnitude as the brake pedal position increases. Two footed driving is indicated by trace 716 transitioning from a low level to a higher level.

Between time T2 and time T3, the accelerator pedal position stabilizes at a lower non-zero level as the driver (not shown) maintains the accelerator pedal in a partially applied position. Since the vehicle is not operating in a performance mode, the controller may provide the total requested vehicle torque including engine or transmission output torque and vehicle braking torque via cancelling at least a portion of engine or transmission output torque by at least a portion of the amount of the requested braking torque. By canceling the engine or transmission output torque based on the requested vehicle braking torque, the engine and/or integrated starter/generator may be operated at a lower load level to conserve fuel and/or electrical energy and reduce driveline torque stress while providing the total requested vehicle torque. In this example, the accelerator pedal is requesting a low amount of vehicle acceleration torque, which may be provided via the engine and/or the integrated starter/generator, but the driver is also requesting vehicle braking torque so the requested engine torque is reduced as compared to if the engine torque were solely based on the requested vehicle acceleration torque, which is based on vehicle speed and accelerator pedal position. In particular, the requested engine torque 712 may be reduced to zero so that the engine may be stopped, or to a low amount, so that the engine may idle while vehicle braking is requested. The electric machine torque request magnitude 714 is a value less than the requested vehicle braking torque 710 so that the total vehicle torque is equal to the sum of requested acceleration torque and requested braking torque. In this way, the vehicle acceleration torque may be cancelled by the requested braking torque so that the engine and integrated starter/generator may be operated at lower load to reduce fuel consumption and driveline torque stress. Two footed driving continues to be indicated.

At time T3, the brake pedal is released as indicated by the brake pedal position and the human driver (not shown) increases application of the accelerator pedal. The requested vehicle acceleration torque increases in response to the increased accelerator pedal position and the requested vehicle braking torque is reduced in response to the brake pedal position. The engine torque request also increases in response to the increased accelerator pedal position and the reduced brake pedal position. The electric machine torque request is reduced to zero. Two footed driving is not indicated because the brake pedal position is zero. The vehicle continues to operate in base or non-performance mode.

Between time T3 and time T4, the human driver (not shown) switches the vehicle operating mode from base to performance mode as indicated by the vehicle mode trace 702. The accelerator pedal position and brake pedal position remain nearly constant and two footed driving is not indicated.

At time T4, the driver (not shown) once again partially releases the accelerator pedal and the vehicle acceleration request begins to decline in response to accelerator pedal position. The brake pedal is not applied and the requested brake torque is zero. The requested engine torque also is reduced in response to the accelerator pedal position. The requested electric machine torque is zero and two footed driving is not indicated. The vehicle continues to operate in performance mode.

At time T5, the human driver (not shown) applies the brake pedal while the accelerator pedal is applied. The accelerator pedal continues to be released and the requested vehicle acceleration torque continues to decline as the accelerator pedal is released. The requested vehicle braking torque increases as the brake pedal position increases. The requested engine torque decreases as the accelerator pedal is released. The requested electric machine torque increases in magnitude as the brake pedal position increases. Two footed driving is indicated by trace 716 transitioning from a low level to a higher level.

Between time T5 and time T6, the accelerator pedal position stabilizes at a lower non-zero level as the driver (not shown) maintains the accelerator pedal in a partially applied position. Since the vehicle is operating in a performance mode, the controller provides the requested vehicle acceleration torque via the engine and/or integrated starter/generator. Further, the requested vehicle braking torque is provided via the rear drive unit electric machine and/or the front drive unit electric machine. The requested engine torque remains non-zero and at a level that provides the requested vehicle acceleration torque. Thus, both the requested vehicle acceleration torque and the requested braking torque are provided at requested levels via providing positive engine or transmission output torque and negative electric machine torque. The engine or transmission output torque is not cancelled via the requested braking torque. By providing engine or transmission output torque at a non-zero level, the vehicle may be operated in a state that improves vehicle torque response if the driver subsequently further applies the accelerator pedal and releases the brake pedal. Two footed driving continues to be indicated.

At time T6, the brake pedal is released as indicated by the brake pedal position and the human driver (not shown) increases application of the accelerator pedal. The requested vehicle acceleration torque increases in response to the increased accelerator pedal position and the requested vehicle braking torque is reduced in response to the brake pedal position. The engine torque request also increases in response to the increased accelerator pedal position and the reduced brake pedal position. The electric machine torque request is reduced to zero. Two footed driving is not indicated because the brake pedal position is zero. The vehicle continues to operate in base or non-performance mode.

In this way, a vehicle may be operated in a non-performance mode to conserve energy and in a performance mode to improve vehicle acceleration. Vehicle acceleration may be improved via operating an engine at condition where engine torque may develop more quickly in response to an increasing vehicle acceleration request.

Thus, the methods described herein provide for a driveline operating method, comprising: generating a total vehicle torque via adding a first requested amount of braking torque to a first requested amount of vehicle acceleration torque in response to an accelerator pedal and a brake pedal being contemporaneously applied in a first mode, the first requested amount of braking torque responsive to brake pedal position, the first requested amount of vehicle acceleration torque responsive to accelerator pedal position; and generating a second requested amount of vehicle acceleration torque responsive to accelerator pedal position and a second requested amount of braking torque responsive to brake pedal position in response to the accelerator pedal and the brake pedal being contemporaneously applied in a second mode, the second requested amount of vehicle acceleration torque responsive to accelerator pedal position and not brake pedal position, the second requested amount of braking torque responsive to brake pedal position and not accelerator pedal position.

In some examples, the method further comprises generating a scalable torque cancellation amount and a regenerative torque gain for each of a plurality of modes including the first mode and the second mode. The method includes where the first requested amount of vehicle acceleration torque and the second requested amount of vehicle acceleration torque are positive torques applied to a vehicle driveline. The method includes where the first and second requested amounts of braking torques are negative torques applied to a vehicle driveline, friction braking torques, or a combination of negative torques applied to the vehicle driveline and friction braking torques. The method further comprises determining an electric machine torque and friction braking torque from the total vehicle torque. The method further comprises providing the total vehicle torque via only an electric machine. The method further comprises determining a friction braking torque in the second mode in response to an electric machine torque and the second requested amount of braking torque.

The methods described herein also provide for a driveline operating method, comprising: scaling a driver demand and a regenerative braking request as a function of accelerator pedal position in response to an accelerator pedal and a brake pedal being simultaneously applied; and adjusting a transmission output torque and an electric machine torque responsive to the scaled driver demand and the scaled regenerative braking request.

The method further comprises determining the driver demand via an accelerator pedal position and a look-up table. The method further comprises determining the regenerative braking request via a brake pedal position. The method includes where scaling the driver demand includes multiplying the driver demand by a value that ranges from zero to one. The method includes where the value is zero for accelerator pedal positions less than a threshold. The method includes where scaling the regenerative braking request includes multiplying the regenerative braking request by a value that ranges from zero to one. The method includes where the value is zero for accelerator pedal positions greater than a threshold.

The methods described herein also provide for a driveline operating method, comprising: while a brake pedal and an accelerator pedal are applied, commanding a transmission output torque from a greater of a scaled driver demand torque, a zero accelerator pedal torque, and a brake pedal position adjusted driver demand torque; and while a brake pedal and an accelerator pedal are applied, commanding an electric machine torque responsive to the brake position adjusted driver demand torque minus the commanded transmission output torque. The method includes where the scaled driver demand torque is a driver demand torque multiplied by a value, the value ranging between zero and one. The method includes where the value is zero for an accelerator pedal position less than a threshold. The method includes where the brake position adjusted driver demand torque is a driver demand torque plus a scaled brake torque request. The method includes where the scaled brake torque request is a brake torque request multiplied by a value having a range from zero to one, the value a function of accelerator pedal position. The method includes where the transmission output torque is provided via an engine and/or an electric machine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
generating a total vehicle torque via a machine, the total vehicle torque based on adding a first requested amount of braking torque to a first requested amount of vehicle acceleration torque in response to an accelerator pedal and a brake pedal being contemporaneously applied in a first mode, the first requested amount of braking torque responsive to brake pedal position, the first requested amount of vehicle acceleration torque responsive to accelerator pedal position; and
generating a second requested amount of vehicle acceleration torque via an engine and generating a second requested amount of braking torque via an electric machine in response to the accelerator pedal and the brake pedal being contemporaneously applied in a second mode, the second requested amount of vehicle acceleration torque responsive to accelerator pedal position, the second requested amount of braking torque responsive to brake pedal position.

2. The method of claim 1, further comprising generating a scalable torque cancellation amount and a regenerative torque gain for each of a plurality of modes including the first mode and the second mode.

3. The method of claim 1, where the first requested amount of vehicle acceleration torque and the second requested amount of vehicle acceleration torque are positive torques applied to a vehicle driveline.

4. The method of claim 1, where the first and second requested amounts of braking torques are negative torques applied to a vehicle driveline, friction braking torques, or a combination of negative torques applied to the vehicle driveline and friction braking torques.

5. The method of claim 1, further comprising determining an electric machine torque and friction braking torque from the total vehicle torque.

6. The method of claim 1, further comprising providing the total vehicle torque via only an electric machine.

7. The method of claim 1, further comprising determining a friction braking torque in the second mode in response to an electric machine torque and the second requested amount of braking torque.

8. The method of claim 1, wherein the machine is an internal combustion engine.

9. The method of claim 1, wherein the machine is an electric machine.

* * * * *